United States Patent
Matsumura et al.

(10) Patent No.: US 6,751,400 B1
(45) Date of Patent: Jun. 15, 2004

(54) REPRODUCING METHOD AND APPARATUS

(75) Inventors: Yoshiaki Matsumura, Tokyo (JP);
Toru Okazaki, Tokyo (JP); Kenji Ogawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/396,268

(22) Filed: Sep. 15, 1999

(30) Foreign Application Priority Data

Sep. 17, 1998 (JP) .......................................... 10-263698
Sep. 17, 1998 (JP) .......................................... 10-263699

(51) Int. Cl.[7] ............................ H04N 5/783; H04N 5/91
(52) U.S. Cl. ............................................ 386/68; 386/81
(58) Field of Search ............................ 386/46, 68, 109, 386/112, 111, 125, 81

(56) References Cited

U.S. PATENT DOCUMENTS 5,771,331 A  * 6/1998 Aoki et al. .................. 386/68
5,841,938 A  * 11/1998 Nitta et al. .................. 386/68
5,974,224 A  * 10/1999 Nagata .......................... 386/109
6,473,558 B1 * 10/2002 Wu et al. ...................... 386/68

* cited by examiner

Primary Examiner—Huy Nguyen
(74) Attorney, Agent, or Firm—Frommer Lawrence & Haug LLP; William S. Frommer; Bruno Polito

(57) ABSTRACT

The reverse direction reproduction of encoded data comprised of picture data compressed in accordance with the MPEG system is to be realized at a higher speed. To this end, plural frame memories are used for reverse direction reproduction. The respective pictures are sequentially decoded and the decoded pictures are sequentially held in the frame memories. If there is no vacant memory, the frame memories are sequentially overwritten beginning from the frame memory which stores the picture decoded first. If the decoding progresses up to the picture to be reproduced, and the decoding of the picture to be reproduced comes to a close, the decoding is transiently halted and the picture to be reproduced is read out from the frame memory and displayed. If the picture to be reproduced is displayed, the frame memory which has held the displayed picture is evacuated. The decoding is re-initiated for decoding the picture consecutive to the picture the data of which are as yet held in the frame memory.

8 Claims, 12 Drawing Sheets

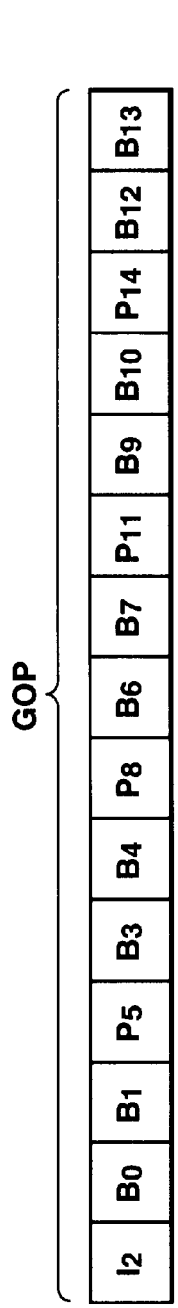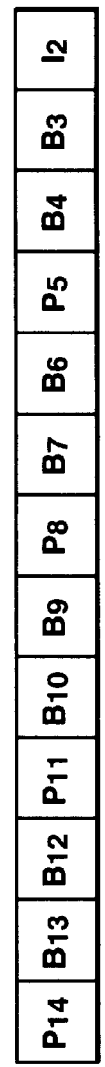
FIG.5A FIG.5B

ENCODED DATA ON RECORDING MEDIUM

REPRODUCING METHOD AND APPARATUS

BACKGROUND OF THE INVENTION

1. Field of the Invention

This invention relates to a method and apparatus for reproducing encoded data compressed in accordance with the MPEG system. More particularly, it relates to a technique of reproduction in a reverse direction in the reproducing method and apparatus.

2. Description of the Related Art

As a compression system for a moving picture exploiting correlation along the time axis across plural frames, an MPEG system (Motion Picture Coding Experts Group System) is being used extensively. For example, the video which has adopted the MPEG system is standardized in ISO-13818-2.

In the MPEG system, intra-frame prediction-coded pictures, which are encoded pictures composed of the information closed in a picture itself, are periodically inserted to enable random accessing, so that there is provided a picture group structure having at least one intra-frame predictive coded picture. This picture group is termed a group-of-pictures (GOP).

An example of the GOP structure in the MPEG system is explained by referring to FIG. 1.

The MPEG system provides three picture types, namely an I-picture, P-picture and a B-picture. The I-picture is the intra-frame predictive-coded picture, while the P-picture is the inter-frame forward predictive-coded picture, obtained by having reference to a previously coded temporally previous frame. The B-picture is a bidirectionally predictive-coded picture obtained on prediction by having reference to temporally previous and temporally posterior pictures. In the MPEG system, at least one I-picture is contained in one GOP.

FIG. 1 shows an example of such GOP structure. FIG. 1A shows the GOP structure in which the respective pictures are arrayed in the sequence of the decoding processing (decoding order), while FIG. 1B shows the state in which the respective pictures are arrayed in the sequence of the original pictures (presentation order).

In the example of FIG. 1, each GOP is made up of 15 frames, namely a sole I-picture, four P-pictures and 10 B-pictures. In FIG. 1, suffix letters to the pictures I, P and B denote the presentation order of these pictures.

In the example of FIG. 1, a picture I2 is encoded by itself, while a picture P5 is inter-frame predictive-coded by having reference to the picture I2. The pictures B3, B4 are inter-frame predictive-coded by having reference to the pictures I2 and the picture P5. Therefore, while the picture I2 can be decoded by itself, decoding of the picture P5 needs data decoded from the picture I2, while decoding of the pictures B3 and B4 need data decoded from the picture I2 and the picture P5.

Since the B-picture, which is the bidirectionally predictive-coded picture, is provided in the MPEG system, the processing order of the encoding processing or the decoding processing differs from the order of the original pictures, as shown for example in FIGS. 1A and 1B. Thus, the original moving picture is resumed by re-arraying the respective pictures, decoded in the sequence shown for example in FIG. 1A, in a proper sequence shown in FIG. 1, and displaying the re-arrayed pictures. Therefore, in order to decode the encoded frames, there is required an operation of sequentially decoding the encoded frames in the correct order taking into account the correlation of the respective pictures I, P and B.

With the data encoded by the MPEG system, there is raised a problem that difficulties are met in reproducing the data in a direction reversed to the time axis direction at an elevated speed by way of performing the reverse direction reproduction. This problem is discussed hereinafter in detail.

If, in the example of FIG. 1, reverse direction reproduction is to be made beginning from the picture B12, the respective pictures need to be displayed in the order of B12, P11, B10, B9, P8, B7, B6, P5, B4, B3, I2, B1, B0, . . . .

However, since it is necessary in the MPEG system to effect decoding sequentially along the time axis direction, the pictures I2, P5, P8, P11 and P14 need to be decoded in this order, if e.g., the picture B12 is to be decoded. If, after the end of decoding of the picture B12, the picture P11 is to be decoded, the pictures I2, P5 and P8 need to be re-decoded.

If, with the progress in the display, it becomes necessary to decode the picture B1, the pictures I2, P5, P8, P11 and P14 of the directly previous GOP need to be decoded sequentially, because the last P-picture of the directly previous GOP is required for decoding the picture B1.

The processing of sequentially decoding the pictures as from the leading end of a GOP is performed every time the respective pictures are displayed during reverse direction reproduction. Thus, in order to assure a constant displaying interval of the respective pictures, it is necessary to control the speed with the maximum time required in the decoding process. This imposes limitations on the speed of the reverse direction reproduction to render it impossible to effect reverse direction reproduction at an elevated speed.

Also, in decoding encoded data of a picture to be reproduced, it is necessary to start the decoding as from the intra-frame predictive-coded picture lying forwardly of the encoded data of the picture to be reproduced. That is, in decoding the encoded data of the picture desired to be reproduced, it is necessary to sequentially decode the intra-frame predictive-coded picture up to the picture to be reproduced without outputting these pictures to outside. If decoding up to the picture to be decoded has come to a close, the decoded data of the picture to be reproduced is outputted. In effecting reverse direction reproduction, the above-described decoding from the intra-frame predictive-coded picture up to the picture to be reproduced is repeatedly performed each time a sole picture is reproduced.

That is, since it is necessary in the reverse direction reproduction to decode the intra-frame predictive-coded picture up to the picture be reproduced, in an iterative fashion, each time a sole picture is to be reproduced. Therefore, if, in reading out the encoded data recorded on the recording medium by way of performing the reverse direction reproduction, the reverse direction reproduction is to be carried out at an elevated speed, the encoded data needs to be read out iteratively from the recording medium at an elevated speed.

As the recording medium for recording picture data, a disc-shaped recording medium or a tape-shaped recording medium is frequently used. However, limitations are imposed on reading out the data from the recording medium at an elevated speed. Thus, it has been difficult to effect the reverse direction reproduction at an elevated speed because of the necessity of repeatedly reading out the encoded data.

This problem is not only limited to the reverse direction reproduction of the data encoded in accordance with the MPEG system, but also is common to the reverse direction reproduction of the data encoded and compressed by exploiting the correlation along the time axis across plural frames.

SUMMARY OF THE INVENTION

It is therefore an object of the present invention to provide a reproducing method and apparatus in which it is possible to realize high-speed reverse direction reproduction of the encoded data comprised of picture data compressed in accordance with e.g., the MPEG system.

The reproducing apparatus according to the present invention is configured for reproducing compressed encoded data by exploiting correlation of picture data along the time axis direction over plural frames. The reproducing apparatus includes decoding means for decoding the encoded data, a frame memory in which to store the picture data decoded by the decoding means, writing means operating so that, in reverse direction reproduction of the encoded data in a direction reversed from the time axis direction, the encoded data of the respective pictures are sequentially decoded, the decoded picture data are sequentially stored in the frame memory, and if there is no vacant frame memory, the frame memories are sequentially overwritten beginning from the frame memory which stores the picture data decoded first, and output means for reading picture data to be reproduced on completion of decoding thereof to output the picture data to be reproduced. The reproducing apparatus also includes control means for performing control so that, on outputting the picture data to be reproduced, the frame memory which has stored the data of the outputted picture is evacuated for writing therein the picture data now to be decoded.

With the reproducing apparatus according to the present invention, the processing of repeatedly decoding the same frame at the time of reverse direction reproduction can be eliminated. That is, with the reproducing apparatus of the present invention, reverse direction reproduction can be realized with a smaller number of times of the decoding operations.

In the reproducing method of the present invention, if the encoded data is to be reproduced in a direction reversed from the time axis direction, the encoded data of the respective pictures are sequentially decoded, and the decoded picture data are sequentially saved in the frame memory. If there is no vacant frame memory, the frame memories are sequentially overwritten beginning from the frame memory which has stored the picture data decoded first. On completion of encoding of the picture data to be reproduced, the frame memory which has stored the data of the outputted picture is evacuated for writing therein the picture data to be decoded next.

With the reproducing method according to the present invention, the processing of repeatedly decoding the same frame at the time of reverse direction reproduction can be eliminated. That is, with the reproducing method of the present invention, reverse direction reproduction can be realized with a smaller number of times of the decoding operations.

In one aspect, the present invention provides a reproducing apparatus including readout means for reading out encoded data from a recording medium, having the encoded data recorded thereon, the encoded data having been compressed by exploiting inter-frame correlation in terms of a picture group structure as a unit, memory means having a storage capacity not less than the volume of the encoded data of the picture group structure, the memory means holding the encoded data read out from the recording medium by the readout means, decoding means for decoding the encoded data read out from the memory means, and control means for performing control for holding the encoded data of the picture group structure containing a picture to be reproduced in the memory means, at the time of reproducing the encoded data recorded on the recording medium in the reverse direction, and for reading out the encoded data repeatedly from the memory means to send the read-out encoded data to the decoding means.

If, at the time of the reverse direction reproduction, the encoded data held by the memory means becomes unnecessary due to completion of decoding, it is preferred that the area of the memory means which held the encoded data now not needed is sequentially cleared and set as vacant area. If there is any vacant area in the memory means at the time of the reverse directional reproduction, it is preferred that the readout means reads out the encoded data which are now necessary and stores the necessary encoded data sequentially in the vacant area of the memory means.

For reverse direction reproduction with the above-described reproducing apparatus of the present invention, encoded data of the picture group structure containing a picture to be reproduced is read out by readout means and stored in the memory means. If the encoded data already read out by the readout means and held in the memory means is required for decoding for reverse direction reproduction, the encoded data held by the memory means are read out and decoded. This eliminates the necessity of repeatedly reproducing the same encoded data to enable reverse direction reproduction.

In another aspect, the present invention provides a method for reverse direction reproduction including the steps of reading out encoded data from a recording medium, having the encoded data recorded thereon, the encoded data having been compressed by exploiting inter-frame correlation in terms of a picture group structure as a unit, holding, in the memory means, the encoded data of at least one picture group structure containing a picture to be reproduced, repeatedly reading out from the memory means the encoded data required for decoding a picture to be decoded, and decoding the read-out encoded data.

If, at the time of the reverse direction reproduction, the encoded data held by the memory means becomes unnecessary due to completion of decoding, it is preferred that the area of the memory means which held the encoded data now not needed is sequentially evacuated and set as vacant area. If, at the time of the reverse direction reproduction, there is any vacant area in the memory means, it is preferred that the readout means reads out the encoded data needed next and stores the encoded data sequentially in the vacant area of the memory means.

For reverse direction reproduction with the above-described reproducing method of the present invention, encoded data of the picture group structure containing a picture to be reproduced is read out by readout means and stored in the memory means. If the encoded data already read out by the readout means and held in the memory means is required for decoding for reverse direction reproduction, the encoded data held by the memory means are read out and decoded. This eliminates the necessity of repeatedly reproducing the same encoded data to enable reverse direction reproduction.

According to the present invention, the encoded data, which is the compressed picture data obtained on MPEG system, can be reproduced in the reversed direction at a higher speed.

According to the present invention, the reverse direction reproduction can be expedited simply by increasing the number of the frame memories. That is, according to the present invention, the reverse direction reproduction can be expedited as the cost is suppressed to a minimum.

If the present invention is applied to a reproducing apparatus having an editing function for picture data, it is possible to improve the tractability at the time of editing, to reduce the time for editing significantly.

BRIEF DESCRIPTION OF THE DRAWINGS

FIGS. 1A and 1B show an illustrative structure of a group-of-pictures (GOP), wherein FIG. 1A shows the structure of a GOP in which the respective pictures are arrayed in the decoding order and FIG. 1B shows the arraying state of the respective pictures in the order of the original pictures, that is in the presentation order.

FIGS. 5A and 5B show an illustrative structure of a group-of-pictures (GOP), wherein FIG. 5A shows the GOP structure in which the respective pictures are arrayed in the order of the decoding processing and FIG. 5B shows the display order of the respective pictures in the case of reverse direction reproduction.

FIGS. 6A, 6B, 6C, 6D, 6E and 6F illustrate typical reverse direction reproduction embodying the present invention and show typical processing in case of employing a frame memory for five pictures.

FIGS. 7A, 7B, 7C, 7D, 7E, 7F and 7G illustrate typical reverse direction reproduction embodying the present invention and show typical processing in case of employing a frame memory for ten pictures.

DESCRIPTION OF THE PREFERRED EMBODIMENTS

Figures 1A, 1B:
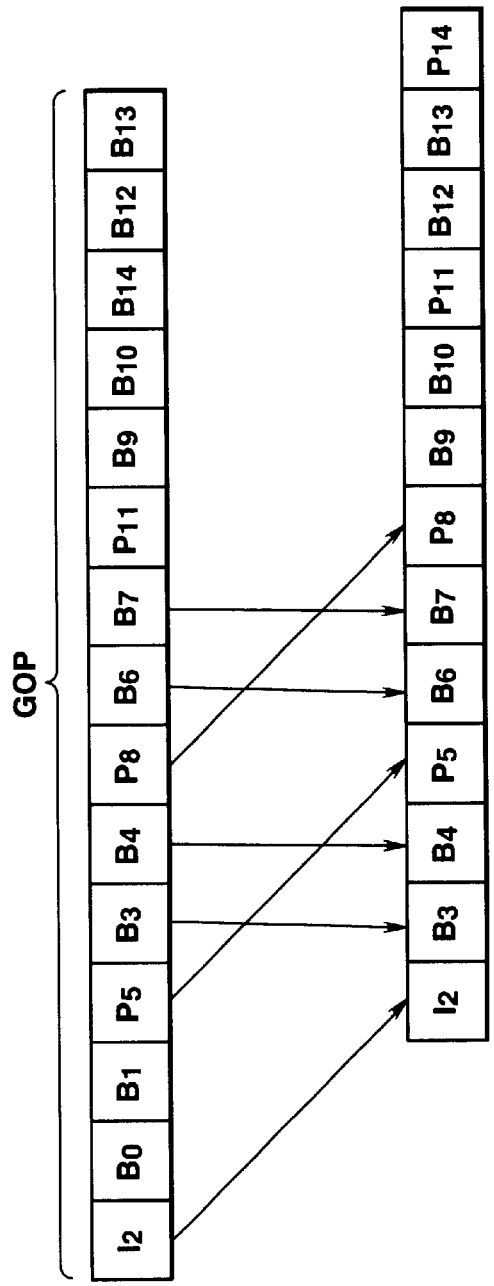

Referring to the drawings, preferred embodiments of the present invention will be explained in detail.

Figure 2:
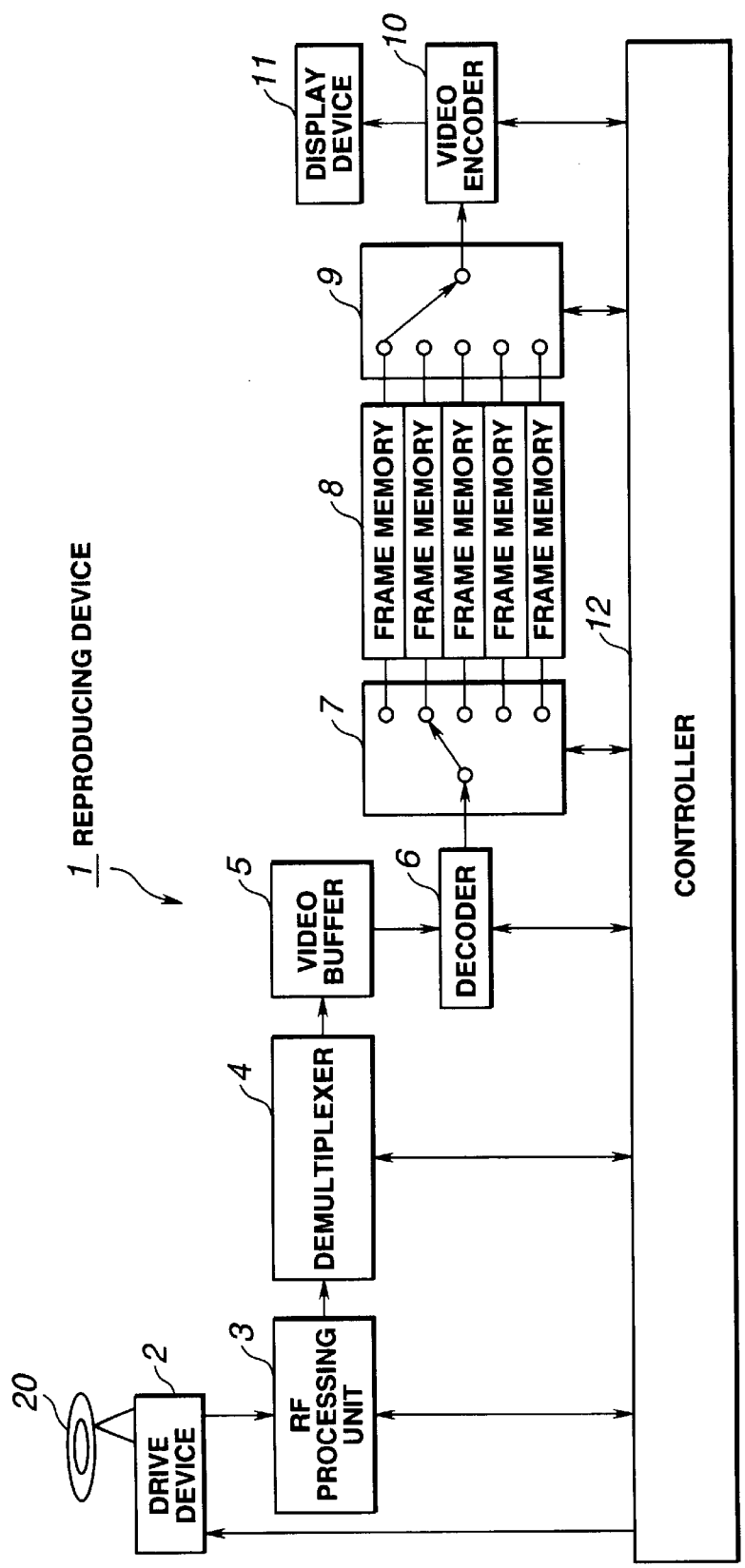
FIG. 2 is a block diagram showing an illustrative structure of a reproducing apparatus embodying the present invention.

FIG. 2 shows an illustrative structure of a reproducing device embodying the present invention. This reproducing device 1 has the function of the reverse direction reproduction and, as shown in FIG. 2, includes a driving unit 2, an RF processor 3, a demultiplexer 4, a video buffer 5, a decoder 6, a decoding switcher 7, a memory 8, a display switcher 9, a video encoder 10, a display unit 11 and a controller 12.

The driving unit 2 reads out data from a recording medium 20, such as an optical disc, and outputs the data as RF signals. The RF processor 3 receives RF signals from the driving unit 2 and processes the RF signals with waveform equalization or binary-coding etc. to generate reproduced data, which is outputted.

The demultiplexer 4 receives the reproduced data from the RF processor 3 and demultiplexes the reproduced data to form video data of the MPEG system. The video buffer 5 receives the video data from the demultiplexer 4 and temporarily stores the video data while furnishing the video data at an appropriate timing to the decoder 6.

The decoder 6 receives the video data from the video buffer 5 and decodes the video data to generate original picture data. The memory 8 is made up of frame memories for five pictures and receives the data of the picture decoded from the. decoder 6 to store the data in one of the frame memories.

The decoding switcher 7 changes over in accordance with decision in which of the frame memories of the memory 8 the data of the decoded picture is to be stored. That is, the decoding switcher 7 operates as a mechanism for making selection in which frame memory the data of the decoded picture is to be stored.

The display switcher 9 selects from which frame memory of the memory 8 the data of the picture stored in the memory 8 is to be read out. That is, the display switcher 9 operates as a mechanism for selecting from which frame memory the picture data is to be read out for display.

The video encoder 10 receives picture data read out from the frame memory selected by the display switcher 9. The display unit 11 receives video signals from the video encoder 10 to display a picture based on the video signals.

The controller 12 controls the operation of the driving unit 2, RF processor 3, demultiplexer 4, decoder 6, decoding switcher 7, display switcher 9 and the video encoder 10.

The reverse direction reproduction by the above-described reproducing device 1 is now explained.

The present reproducing device 1 employs frame memories for five pictures to raise the efficiency of the decoding sequence to enable high-speed reverse direction reproduction. Specifically, the present reproducing device 1 sequentially repeats the following three processing operations for reverse direction reproduction:

(a) Each picture is sequentially decoded and each decoded picture is sequentially stored in each frame memory. If there is no vacant frame memory, the non-vacant frame memories are sequentially overwritten, beginning from the frame memory storing an picture decoded first.

(b) If decoding proceeds up to a picture desired to be reproduced, and the picture desired to be reproduced has been completed, the decoding is discontinued for the moment and the picture desired to be reproduced is read out from the frame memory and displayed on the display unit 11.

(c) If the picture desired to be reproduced is read out, the frame memory which has stored the picture thus displayed is kept evacuated and decoding is re-started so that the picture continuing to the picture stored as yet in the frame memory will be decoded.

The control for the reverse direction reproduction may be roughly classified into the control for picture decoding processing, referred to below as the decoding processing control, and the control for the picture display processing, referred to below as the display processing control. These two interact in operation to realize the above-described reverse direction reproduction. The decoding processing control and the display processing control will be explained hereinafter respectively.

First, the decoding processing control is explained.

In the decoding processing control, the reproducing device 1 controls the decoding unit 6 and the decoding switcher 7 by the controller 12 to decode the pictures sequentially as the reproducing device 1 utilizes the frame memories to the maximum extent possible. If the frame memories have been used up and yet the picture desired to be reproduced has not been reached, the frame memories are sequentially overwritten, beginning from the frame memory storing the picture decoded first, that is the frame memory storing the picture displayed temporally posteriorly, so that the decoding processing is sequentially continued until the picture desired to be reproduced is decoded.

If decoding has been completed up to the picture desired to be reproduced, decoding is transiently halted to wait until a vacant frame memory is produced by the display processing control. At this time, the controller 12 issues a command to the driving unit 2 or to the RF processor 3 for making preparations for re-furnishing the necessary data.

If display proceeds by display processing control, there is produced a vacant frame memory. When this vacant frame is produced, a picture continuing to and lying just ahead the picture decoded by the previous decoding is set as the picture desired to be reproduced and the decoding processing is sequentially prosecuted in the same way as described above. In the decoding processing control, the above-described operations are repeatedly performed to effect continuous decoding processing at the time of the reverse direction reproduction.

Figure 3:
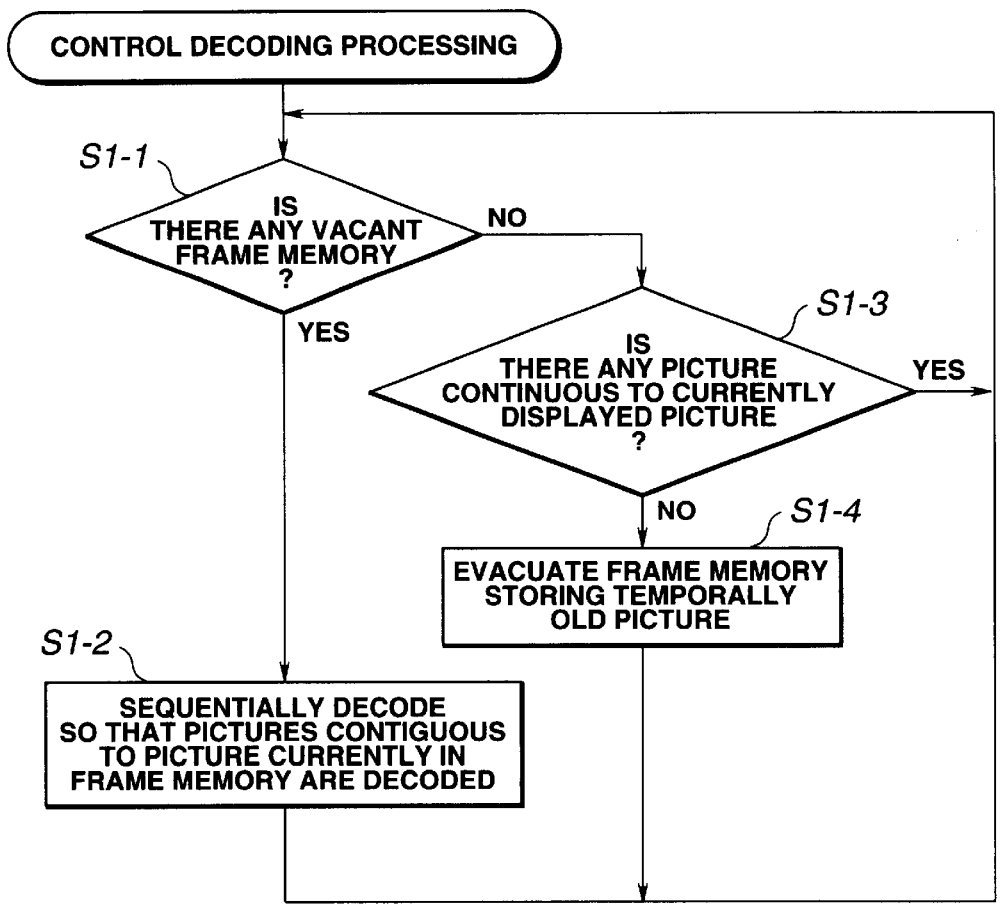
FIG. 3 shows a processing flow of decoding processing control.

The specified processing flow of the decoding processing control is shown in FIG. 3.

Referring to FIG. 3, it is checked at step S1-1 of the decoding processing control whether or not there is any vacant frame memory. If there is any vacant frame memory, the program moves to step S1-2 and, if otherwise, the program moves to step S1-3.

At step S1-2, pictures are sequentially decoded. This decoding processing is executed in such a manner that pictures consecutive to the picture now in the frame memory will be decoded sequentially. If decoding of one picture comes to a close, the program reverts to step S1-1 to repeat the processing.

At step S1-3, it is checked whether there are pictures consecutive up to the picture currently displayed are on the frame memories. If the result is YES, the program reverts to step S1-1, under display processing control, to repeat the processing until there is produced a vacant frame memory. If the result of check at step S1-3 is NO, the program moves to step S1-4.

At step S1-4, the frame memory holding the temporally old picture, that is the picture decoded first, is evacuated. The program then reverts to step S1-1 to repeat the processing.

By the processing in accordance with the above-described processing flow, the decoding processing control is executed.

The display processing control is hereinafter explained.

For the display processing control, if the picture desired to be reproduced has been decoded during reverse direction reproduction, the display processing for this picture is started. Insofar as the decoding of the picture to be reproduced has been completed, the pictures are displayed in the reverse sequence to the presentation order, in accordance with the specified display interval. Also, in the display processing control, the frame memories storing the pictures, the display of which has been terminated, are sequentially displayed. In the display processing control, the above-described operations are repeatedly performed to enable continuous reverse direction reproduction.

Figure 4:
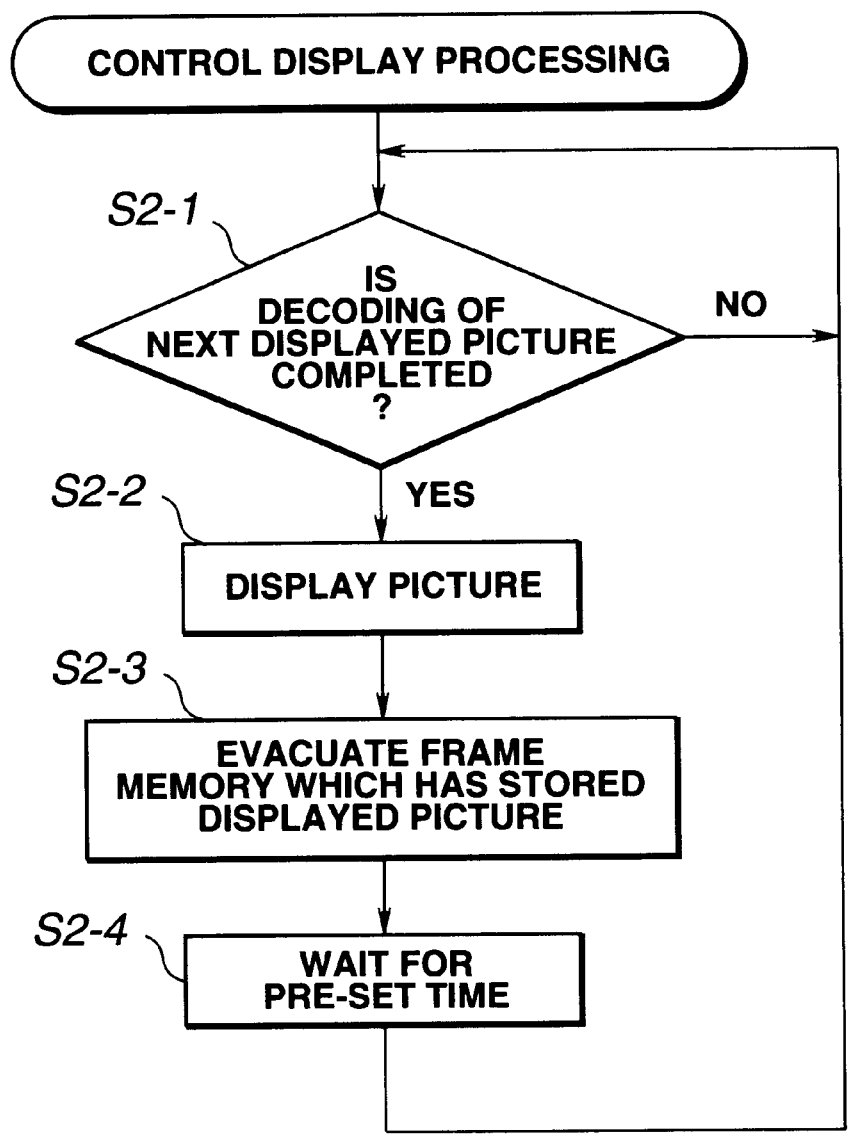
FIG. 4 shows a processing flow of displaying processing control.

FIG. 4 shows the illustrative processing flow of the display processing control.

Referring to FIG. 4, it is first checked at step S2-1 of the display processing control whether or not the decoding of the picture displayed next has been completed. If the result is NO, the waiting state is set until the decoding comes to a close by the decoding processing control to repeat the processing of step S2-1. If the result of check at step S2-1 is YES, the program moves to step S2-2.

At step S2-2, the picture is displayed. Next, at step S2-3, the frame memory which has stored the picture just displayed is evacuated. Then, at step S2-4, after waiting for a pre-set time in accordance with the specified display interval, the program reverts to step S2-1 to repeat the processing.

The display processing control is executed by the processing in accordance with the processing flow described above.

The reverse direction reproduction, which is executed by the above-described decoding processing control and display processing control, is further explained taking a specified example.

It is assumed that picture data having the GOP structure as shown in FIG. 5A are displayed by reverse direction reproduction beginning from the picture P14, as shown in FIG. 5B. As explained previously with reference to FIG. 1, the I-picture is an intra-frame predictive-coded picture, a P-picture is an inter-frame predictive-coded picture and a B-picture is a bidirectionally predictive-coded picture.

FIG. 5 shows how the frame memories of the reproducing device 1 are used in case of reverse direction reproduction shown in FIG. 5B. FIG. 6 shows the manner in which pictures are stored in the 5-picture frame memories.

First, Referring to FIG. 6A, the pictures I2, P5, P8, P11 and B9 are sequentially decoded and stored in the frame memories. When the picture B9 has been decoded, there is no vacant frame memory, however, the picture P14 desired to be displayed has as yet not been reached. Thus, as shown in FIG. 6B, the picture I2 decoded first is overwritten by a newly decoded picture B10. Similarly, as shown in FIG. 6C, the pictures P14, B12 and B13 are decoded to overwrite the pictures P5, P8, B9, respectively.

This has continuously decoded the pictures that can be displayed, as shown in FIG. 6C. Then, under display processing control, display is started in the order of the numbers entered on the bottom side of FIG. 6C. That is, the pictures P14, B13, B12, P11 and B10 are read out sequentially from the frame memories and displayed in this order.

Although the display is started as from the picture P14, the frame memory which has stored the picture P14 is evacuated at a stage when the display of the picture P14 is terminated, as shown in FIG. 6D. Since the frame memory has been evacuated, decoding processing is re-initiated by decoding processing control. At this time, the pictures B13, B12, P11 and B10 are present on the frame memories, such that it is desired to decode next the pictures B9, B8, . . . consecutive to these pictures.

Thus, for decoding the B9, B8, . . . , the picture I2 is again decoded and the decoded picture I2 is stored in the now vacant frame memory. Similarly, when the display of the picture B13 has come to a close and a vacant frame memory is produced, the picture P5 is decoded and saved in the frame memory. Next, when display of the picture B12 has come to a close and a vacant frame memory has been produced, the picture P8 is decoded and saved in this frame memory. FIG. 6E shows the state in which the process just described has been executed.

At this stage, the picture P9 has not been reached. It is assumed that, at this stage, there is no vacant frame memory. In this case, the temporally old picture I2 is overwritten by the newly decoded picture B9, as shown in FIG. 6F. Since this has consecutively decoded the pictures that can be displayed, as shown in FIG. 6F, picture display occurs consecutively in the order of the numbers entered on the lower side of FIG. 6F under control by display processing control. The reverse direction reproduction is executed by continuing the above-described processing.

By effectively utilizing the five frame memories for reverse direction reproduction, it is possible to reduce the processing of decoding the same picture repeatedly during reverse direction reproduction, thus realizing the reverse direction reproduction with a smaller number of decoding processing operations. The above-described reverse direction reproduction enables the high-speed reverse direction reproduction.

In the foregoing description, the case of employing frame memories for five pictures is explained as an example. According to the present invention, it suffices if there are provided frame memories for four or more pictures, so that the above case is merely illustrative and is not limitative of the present invention. It is noted that the more the number of the frame memories, the lesser is the processing required for decoding the same picture repeatedly during the reverse direction reproduction, thus enabling reverse direction reproduction at a higher speed.

As a second example, the case in which there are frame memories for ten pictures is explained. In the present case, it is assumed that the picture data having the GOP structure as shown in FIG. 5A is displayed by reverse direction reproduction beginning from the picture P14, as shown in FIG. 5B.

First, the pictures I2, P5, B3, B4, P8, B6, B7, P11, B9 and B10 are sequentially decoded and stored in the frame memories as shown in FIG. 7A.

When the picture B10 has been decoded, there is left no vacant frame memory, however, the picture P14 desired to be displayed has not as yet been reached. Thus, as shown in FIG. 7B, the picture I2 decoded first is overwritten by the newly decoded picture P14. This completes the decoding of the picture P14 displayed first, however, decoding of the picture consecutive to the picture P14 has at this stage not been completed. Thus, as shown in FIG. 7C, the pictures B12, B13 are decoded to overwrite the frame memories which have so far stored the pictures B3 and B4.

This has consecutively decoded the pictures that can be displayed, as shown in FIG. 7C. At this time, the display is started in the order of the numbers entered on the bottom side of FIG. 7C under display processing control. That is, the pictures P14, B13, B12, P11, B10, B9, . . . are read out in this order from the frame memories and displayed sequentially. It is noted that, although the display is started as from the picture P14, the frame memory which has stored the picture P14 is evacuated at the stage the display of the picture P14 is completed, as shown in FIG. 7D.

Since there is produced the vacant frame memory, the decoding processing is re-initiated under decoding processing control. Since the pictures B13, B12, P11, B10, B9, P8, B7, B6 and P5 are present in the frame memories, it is desirable to decode the pictures B4, B3, . . . consecutive thereto.

For decoding the pictures B4, B3, . . . the picture I2 is again decoded and stored in the vacant frame memory. In similar manner, when the display of the picture B13 is completed and there is produced a vacant frame memory, the picture B3 is decoded and stored in the vacant frame memory. If next the display of the picture B12 comes to a close and there is produced a vacant frame memory, the picture B4 is decoded and stored in the frame memory. FIG. 7E shows the state up to this process.

If display progresses further and there is produced a vacant frame memory, the pictures B1, B0 need to be decoded. It is now assumed that, for decoding the pictures B1, B0, the picture P12 and a picture P'14 of a directly previous GOP are required for decoding the pictures B1, B0. In this case, decoding is started as from the picture I'2 of the directly previous GOP and decoding is continued up to the picture P'14. When the decoding up to the picture P'14 has come to a close, the pictures B1 and B0 are started to be decoded.

FIGS. 7F and 7G show the process up to the decoding of the pictures B0, B1. FIG. 7F shows the state in which display up to the picture P8 has been completed such that the pictures I'2, P'5, P'8 and P'11 of the directly previous GOP have been overwritten in the frame memories which have stored the pictures P11, B10, B9 and P8. On the other hand, FIG. 7G shows the state in which the picture P'14 has been overwritten in the frame memory which has so far stored the picture I'2 of the directly previous GOP and in which, responsive thereto, the pictures B1, B0 are decoded and overwritten in the frame memories which have stored the pictures P'5 and P'8 of the directly previous GOP.

When the pictures of the directly previous GOP are decoded in this manner, the pictures B'3, B'4 at the beginning portion of the directly previous GOP are obviously subsequently overwritten, if these pictures are decoded at the stage of decoding the pictures B1, B0, judging from the fact that the frame memories for ten pictures are being used. Thus, for decoding the pictures of the directly previous GOP, the pictures B'3, B'4 lying at the beginning portion of the directly previous GOP are not decoded at this stage. If certain B-pictures are skipped in decoding, unneeded decoding processing can be diminished to expedite the reverse direction reproduction further.

By continuously prosecuting the above-described processing, reverse direction reproduction is realized using frame memories for ten pictures. By employing a larger number of frame memories, the processing of decoding the same picture repeatedly during reverse direction reproduction can be reduced further in volume to enable the reverse direction reproduction by a smaller number of decoding processing. Thus, the reverse direction reproduction employing a larger number of frame memories leads to realization of reverse direction reproduction at a drastically increased speed.

From the viewpoint of decoding the same picture repeatedly during the reverse direction reproduction, a number of frame memories corresponding to the number of the pictures contained in sole GOP are sufficient. That is, in the preferred embodiment, 15 frame memories at the maximum are sufficient, such that, if there are frame memories for 15 pictures, the reverse direction reproduction can be executed at a significant high speed without doing the processing of decoding the same pictures repeatedly.

A second embodiment of the present invention is hereinafter explained with reference to the drawings. In the following explanation, the present invention is applied to a DVD reproducing device adapted for reproducing picture data etc. from the DVD in current use as an optical disc having image data etc. recorded thereon.

Figure 8:
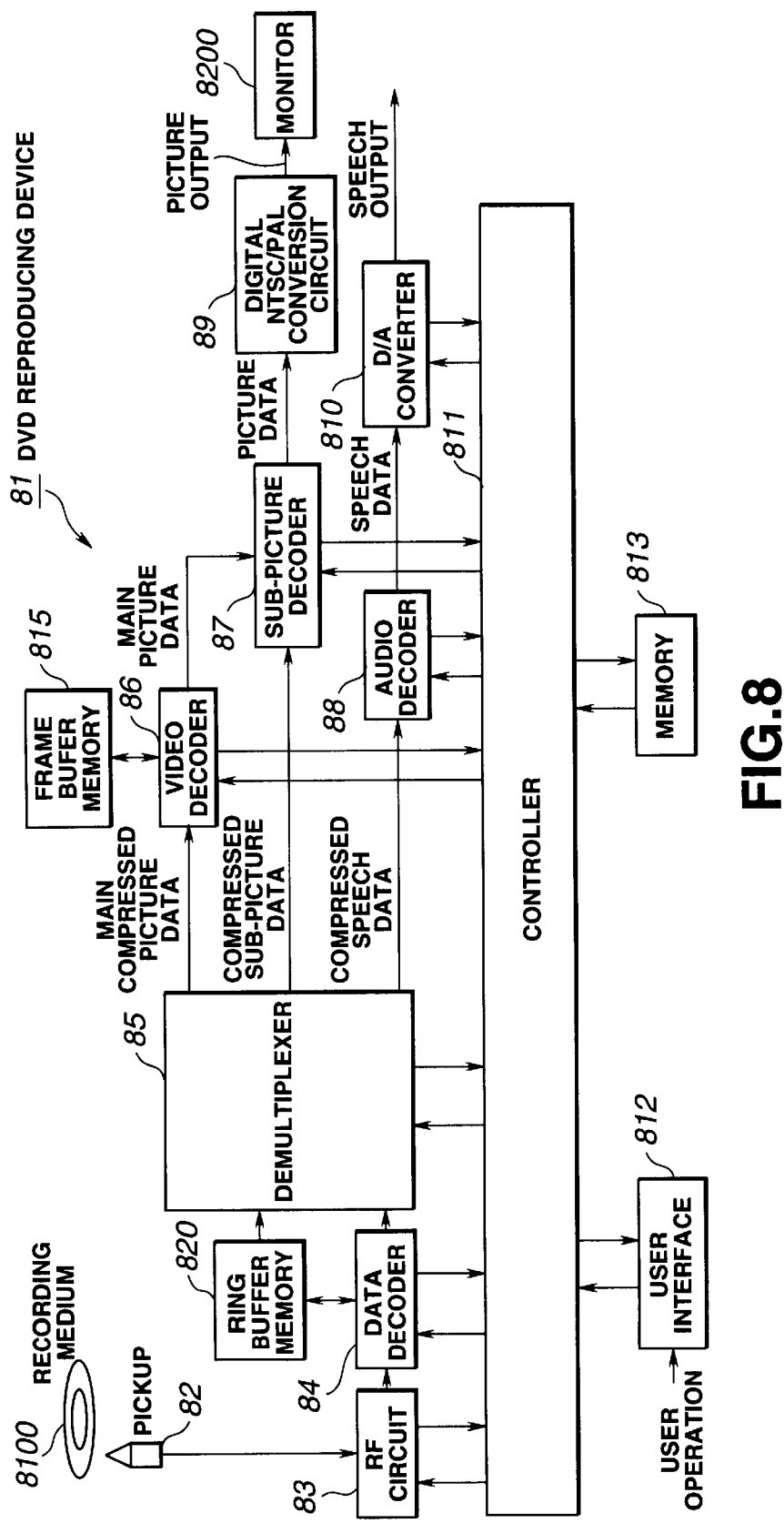
FIG. 8 is a block diagram showing an illustrative structure of a DVD reproducing apparatus embodying the present invention.

FIG. 8 shows an illustrative structure of a DVD reproducing device 81 according to the present invention. The DVD reproducing device 81 includes a pickup 82 for reproducing RF signals from a recording medium (DVD) 8100, an RF circuit 83, fed with the RF signals reproduced from the pickup 82 for doing the binary-coding of the RF signals, a data decoder 84 fed with reproduced data from the RF processor 83 to perform decoding such as error correction, a ring buffer memory 820 for temporarily storing the reproduced data decoded by the data decoder 84, and a demultiplexer 85 for separating the decoded reproduced data from the data decoder 84 into main picture compressed data, sub-picture compressed data and audio compressed data.

The DVD reproducing device 81 also includes a video decoder 86 for decoding the main picture compressed data outputted from the demultiplexer 85, a sub-image decoder 87 for decoding the sub-picture compressed data outputted by the multiplexer 85 and an audio decoder 88 for decoding the audio compressed data outputted by the demultiplexer 85.

The DVD reproducing device 81 also includes a digital NTSC/PAL conversion circuit, referred to below simply as NTSC conversion circuit 89, fed with picture data synthesized sub-picture data from the sub-image decoder 87 and the main picture data from the video decoder 86 to convert the picture data into NTSC or PAL signals. The NTSC signals or the PAL signals from the NTSC conversion circuit 89, outputted by the DVD reproducing device 81, are inputted to a monitor 8200 as a picture.

The DVD reproducing device 81 also includes a digital/analog conversion circuit (D/A conversion circuit) 810 fed with audio data from the audio decoder 88 to convert the audio data into analog signals.

The DVD reproducing device 81 also includes a pickup 82, RF processor 83, data decoder 84, multiplexer 85, a video decoder 86, a sub-image decoder 87, audio decoder 88, a controller 811 for controlling the NTSC conversion circuit 89 and the D/A converter 810, an interface 812 for mediating the controller 811 and the user actuating input, and a memory 813 as a data storage unit for the controller 811.

Figure 9:
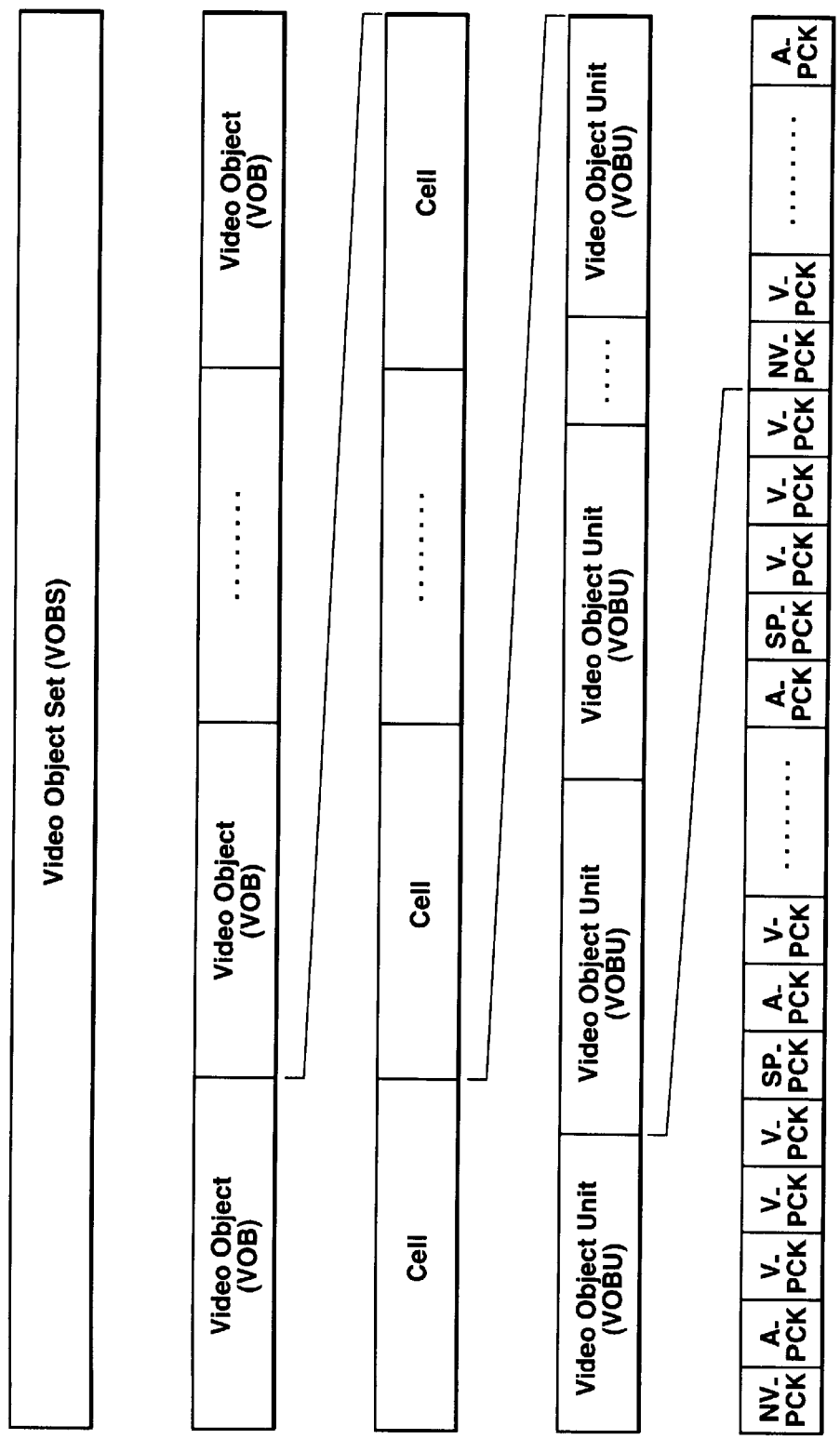
FIG. 9 shows an illustrative structure of a DVD format.

On a recording medium 8100, as an object of reproduction by the DVD reproducing device 81, the encoded data, processed with the picture compression processing in accordance with the MPEG system, are recorded in accordance with the DVD format shown in FIG. 9, in terms of a video object set (VOBS) as a unit. That is, a complete film of a motion picture, for example, is recorded as a VOBS on the recording medium 8100.

The VOBS is made up of plural video objects (VOBs), each VOB being constituted by plural cells. Each cell constitutes a scene in a motion picture. The cell is constituted by plural video object units (VOBUs).

The VOBU is made up of navigation data, main picture compressed data, sub-picture compressed data and audio compressed data. Meanwhile, the DVD uses the MPEG system for compressing the main picture data. The main picture compressed data, contained in a VOBU, is made up of one or more GOPs.

The navigation data, main picture compressed data, sub-picture compressed data and audio compressed data, constituting the VOBU, are recorded by being packed in the navigation pack (NV_PCK), main picture pack (V_PCK), sub-picture pack (SP_PCK) and audio pack (A_PCK), respectively.

The navigation data is the information concerning data in the VOBU or data having the information for special reproduction recorded thereon. The sub-picture compressed data is the data on title etc. and constitutes a sub-picture stream in the DVD format. The audio compressed data is data on speech and constitutes an audio stream in the DVD format.

The data recorded on the recording medium 8100 in accordance with the above-described DVD format is read out by the pickup 82 of the DVD reproducing device 81. The pickup 82 illuminates the laser light from a laser light source built into the pickup 82 on the signal recording surface of the recording medium 8100 to receive the reflected light from the signal recording surface. The pickup 82 feeds the RF signals, reproduced responsive to the received light, to the RF processor 83.

The RF processor 83 executes waveform equalization and binary coding of the RF signals to generate reproduced data and the synchronization signals. The reproduced signals, generated by the RF processor 83, are routed to the data decoder 84.

The data decoder 84 executes decoding processing, such as error correction, on the reproduced data generated by the RF processor 83. The reproduced data, decoded, for example, error-corrected, by the data decoder 84, is transiently held in the ring buffer memory 820 and read out therefrom at an appropriate timing so as to be a supplied to the demultiplexer 85.

The ring buffer memory 820 is configured so that writing in an optional portion of the ring buffer memory 820 and readout from an optional portion of the ring buffer memory 820 may occur simultaneously and without pertinency to each other. The recording capacity in the ring buffer memory 820 is set so as to be 1 GOP or more. Meanwhile, a GOP is a unit of a picture group structure provided in the MPEG system and includes at least one intra-frame predictive-coded picture.

The demultiplexer 85 splits the reproduced data, decoded, e.g., error-corrected, by the data decoder 84, into various packs. That is, the demultiplexer 85 splits the reproduced data into navigation pack (NV_PCK), main picture pack (V_PCK), sub-picture pack (SP_PCK) and audio pack (A_PCK). The demultiplexer 85 sends the navigation pack (NV_PCK) to the controller 811, while sending other packs to the respective decoders associated with the respective packs.

That is, the demultiplexer 85 sends the main picture pack (V_PCK) mainly composed of the main picture compressed data to the video decoder 86, while sending the sub-picture pack (SP_PCK) composed of the sub-picture compressed data to the sub-image decoder 87 and sending the audio pack (A_PCK) composed of the audio compressed data to the audio decoder 88.

The video decoder 86 decodes the main picture compressed data in the main picture pack supplied from the demultiplexer 85 to generate, by this decoding processing, the main picture data comprised of an expanded version of main picture compressed data. It is noted that the video decoder 86 has a frame buffer memory 815 required for decoding the main picture compressed data annexed thereto. The video decoder 86 exploits this frame buffer memory 815 to decode the main picture compressed data. The video decoder 86 routes the generated main picture data to the sub-image decoder 87.

The sub-image decoder 87 decodes the sub-picture compressed data in the sub-picture pack supplied from the demultiplexer 85 to generate sub-picture data which is an expanded version of the sub-picture compressed data. The sub-image decoder 87 synthesizes the sub-picture data to main picture data supplied from the video decoder 86 to generate picture data. That is, the sub-image decoder 87 synthesizes the title data etc. reproduced as the sub-picture data to main picture data. The sub-image decoder 87 sends the generated picture data to the NTSC conversion circuit 89. Failing the sub-picture data, the sub-image decoder 87 directly sends the main picture data supplied from the video decoder 86 to the NTSC conversion circuit 89 as picture data.

The NTSC conversion circuit 89 converts the picture data from digital data into television signals, such as NTSC or PAL signals. The television signals from the NTSC conversion circuit 89 to the monitor 8200 where the signals are displayed as a picture.

The audio decoder 88 decodes the audio compressed data in the audio pack supplied from the demultiplexer 85. By this decoding, audio data which is the expanded version of the audio compressed data is generated. The audio decoder 88 routes the generated audio data to the D/A converter 810.

The A/D converter 810 converts the audio data, which is the digital data, to analog audio data, which is outputted. If this output is suppled to a speaker etc, the user can hear the reproduced speech from the recording medium 8100.

The controller 811 controls the operation of the pickup 82, RF processor 83, data decoder 84, demultiplexer 85, video decoder 86, sub-image decoder 87, audio decoder 88, NTSC conversion circuit 89 and the D/A converter 810. The controller 811 is fed with an actuating input by the user via a user interface 812 comprised of an operating panel or a remote controller to control the various circuits based on the actuating input.

The operation during the reverse direction reproduction of the DVD reproducing device 81 is hereinafter explained.

In the encoded data, compressed in accordance with the MPEG system, each GOP contains at least one intra-frame predictive-coded picture which completes the encoding within the frame without taking correlation with temporally forward or backward pictures. For decoding a picture being reproduced, it suffices if encoded data is sent to the video decoder 86 for decoding from the leading end of the GOP containing the picture or that of the directly previous GOP, referred to below as the leading GOP end.

For reverse direction reproduction, a picture to be reproduced proceeds in a reverse direction to the time axis direction. Thus, for reverse direction reproduction, encoded data from the leading GOP end up to the picture to be reproduced is first routed to the video recorder 86 for decoding. Next, the encoded data from the leading GOP end up to the second picture to be reproduced, that is the directly previous picture, is routed to the video recorder 86 for decoding. Then, the encoded data from the leading GOP end up to the third picture to be reproduced, that is the second previous picture, is routed to the video recorder 86 for decoding. In similar manner, the encoded picture from the leading GOP end up to the picture to be reproduced is sequentially sent to the video recorder 86 for decoding to achieve reverse direction reproduction.

In the DVD device 1 embodying the present invention, the encoded data once read out from the recording medium 8100 is saved in the ring buffer memory 820, taking into account the fact that the encoded data required for one decoding operation is only a continuous portion on the recording medium and moreover that such encoded data is repeatedly used in many cases for decoding. If, in the reverse direction reproduction, the encoded data previously read out from the recording medium 8100 is repeatedly used for decoding, it is not newly read out from the recording medium 8100, but the same encoded data stored in the ring buffer memory 820 is used. That is, the reference pictures for prediction, repeatedly required for decoding at the time of decoding, that is the I-picture or the P-pictures, are transiently stored in a ring buffer 200 and repeatedly read out therefrom. This eliminates repeated read-out of data from the recording medium 8100 to enable expedition of the reverse direction reproduction.

In performing reverse direction reproduction using the ring buffer memory 820, the encoded data recorded first in the reverse direction reproduction is read out from the recording medium 8100 on the GOP basis, using the pickup 82, RF processor 83 and the data decoder 84 to write the encoded data in the ring buffer memory 820.

Of the encoded data written in the ring buffer memory 820, the data required for decoding a picture reproduced first, that is the encoded data from the leading GOP end to the picture to be reproduced, is read out from the ring buffer memory 820. The encoded data read out from the ring buffer memory 820 is sent to the demultiplexer 85 and subsequently decoded by the respective decoders.

Then, of the encoded data written in the ring buffer memory 820, the data required for decoding a picture reproduced second, that is a directly previous picture, that is the encoded data from the leading GOP end to the picture to be reproduced, is read out from the ring buffer memory 820. The encoded data read out from the ring buffer memory 820 is sent to the demultiplexer 85 as described above and subsequently decoded by the respective decoders.

The reverse direction reproduction is prosecuted by sequentially executing the above-described processing. While the encoded data required for decoding the picture to be reproduced is read out from the ring buffer memory 820 for decoding, the encoded data required next is previously read out from the recording medium 8100 and sequentially written in the vacant area of the ring buffer memory 820.

Thus, if the encoded data required for decoding needs to be sent to the multiplexer 85, the encoded data required for decoding has been read out from the recording medium 8100 so as to be present in the ring buffer memory 820. As the reverse direction reproduction is sequentially prosecuted in this manner, the area of the recording area of the ring buffer memory 820 in which the reproduction is completed and becomes unneeded is set as a vacant area in which to capture the next encoded data.

The control processing for the ring buffer memory 820 for the reverse direction reproduction described above is further explained in detail.

Figure 10:
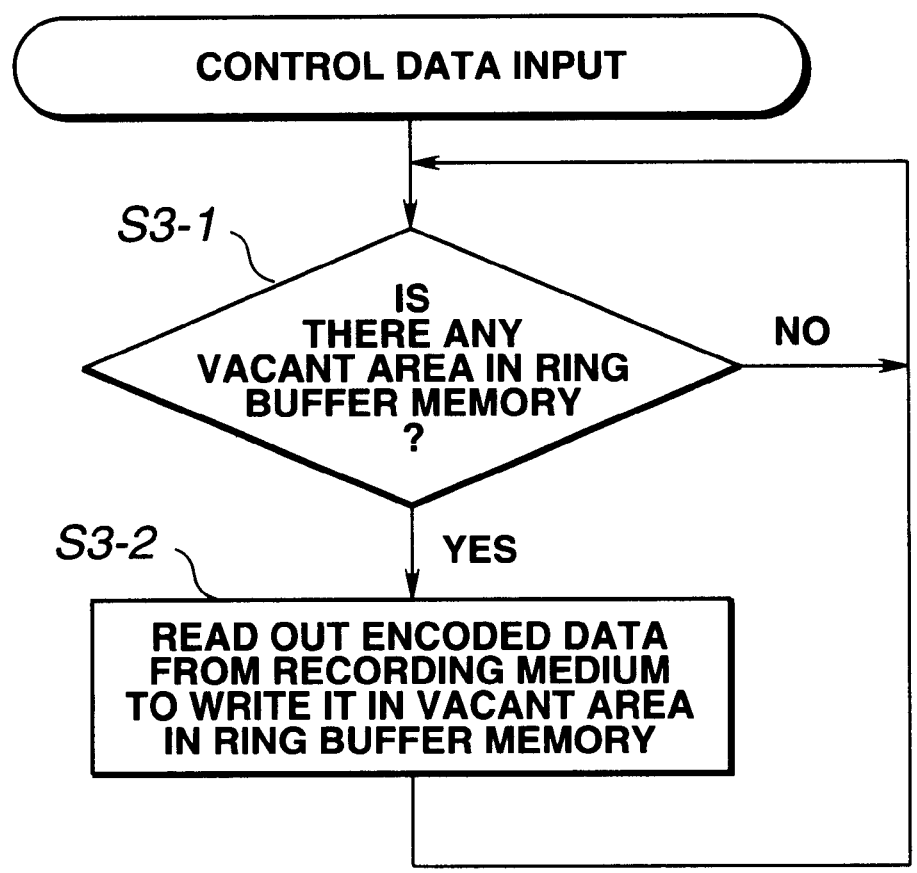
FIG. 10 shows the flow of data inputting control processing.
Figure 11:
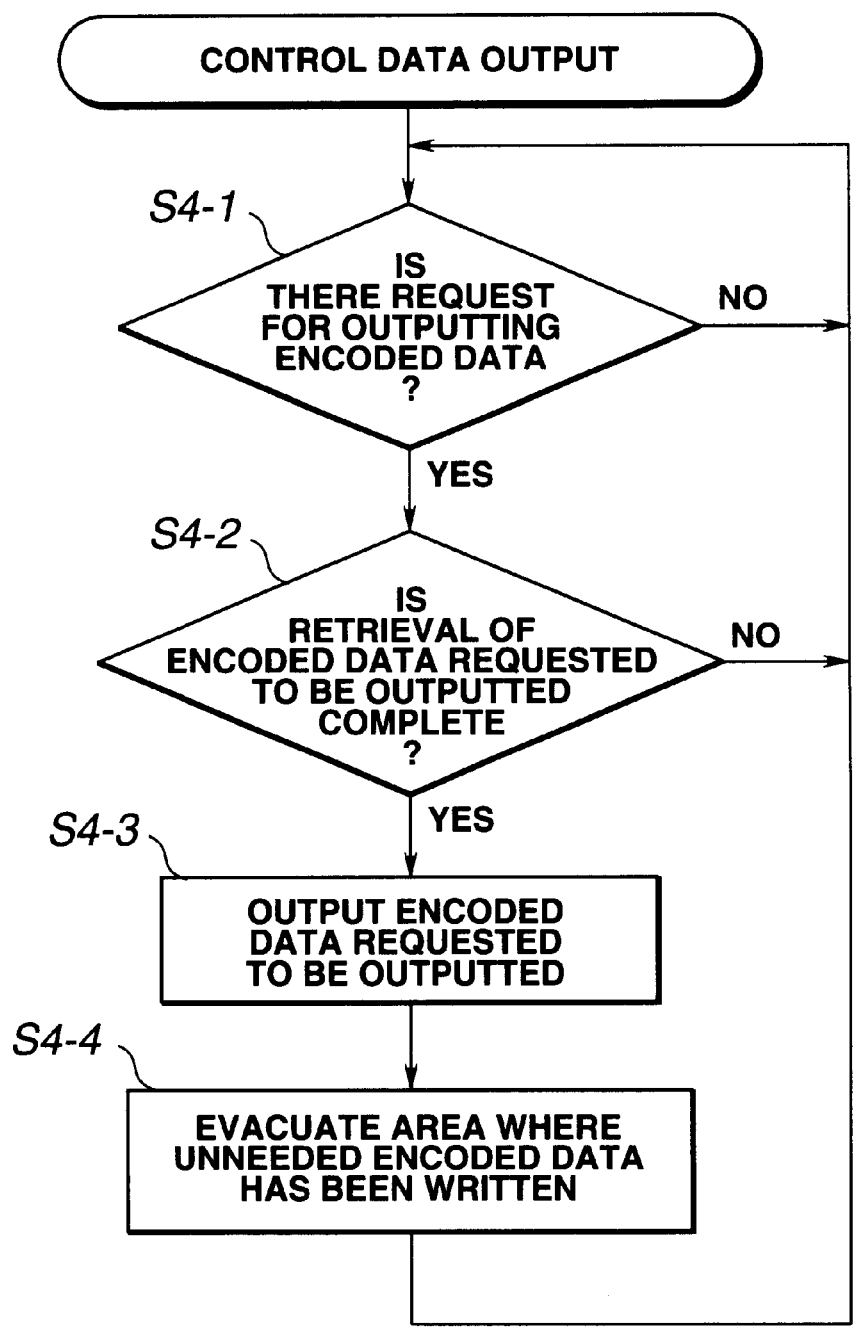
FIG. 11 shows the flow of data inputting control processing.

The control processing for the ring buffer memory includes data inputting control processing of reading out encoded data from the recording medium 8100 for writing in the ring buffer memory 820 (FIG. 10) and data outputting control processing of reading out the encoded data required for decoding from the ring buffer memory 820 (FIG. 11).

In the data inputting control processing, it is checked first at step S3-1 whether or not there is any vacant area in the ring buffer memory 820. If there is no vacant area, the waiting state is set for waiting until the vacant area is provided. If there is any vacant area, the program moves to step S3-2.

At step S3-2, the encoded data lying ahead of the encoded data on the ring buffer memory 820 is read out from the recording medium 8100 in an amount corresponding to the vacant area of the ring buffer memory 820 so as to be written in the vacant area of the ring buffer memory 820. The program reverts to step 3-1 to repeat the processing.

By this data input control processing, the encoded data required for decoding are read out from the recording medium 8100 and written in the ring buffer memory 820 each time a vacant area is produced in the ring buffer memory 820.

In the data outputting control processing, it is first checked at step S4-1 whether or not there is any request commanding the readout and outputting of the encoded data from the ring buffer memory 820, as shown in FIG. 11. If there is no request for outputting the encoded data, the waiting state is set for waiting until the request for outputting the encoded data is issued. In there is the request for outputting the encoded data, the program moves to step S4-2.

At step S4-2, it is checked whether or not the encoded data requested to be outputted has already been captured into the ring buffer memory 820. If the encoded data requested to be outputted has not been captured, the program reverts to step S4-1 to repeat the processing until the encoded data is captured by the data inputting control processing. If the encoded data requested to be outputted has been captured, the program moves to step S4-3.

At step S4-3, the encoded data requested to be outputted is outputted from the ring buffer memory 820. The encoded data outputted by the ring buffer memory 820 is sent to the demultiplexer 85 as mentioned above so as to be decoded by the respective decoders.

Then, at step S4-4, the area of the storage area of the ring buffer memory 820 in which has been written the encoded data now not needed due to the end of reproduction is set as a vacant area. The program then reverts to step S4-1 to repeat the processing. Meanwhile, if a vacant area is produced by the processing at step S4-4, new encoded data is read out from the recording medium 8100 by the above-described data inputting control processing so as to be newly written in the ring buffer memory 820.

An illustrative use of the storage area of the ring buffer memory 820 in case of performing the above-described buffer memory control processing is shown in FIG. 12. For convenience of explanation, only the picture data recorded on the GOP basis are explained, while the processing on other data, such as navigation data, is not specifically explained.

Figure 12A:
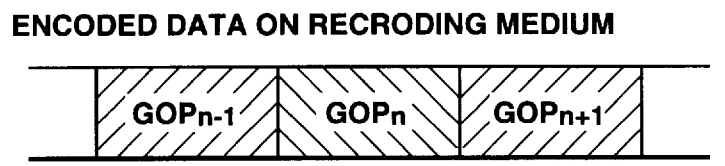
FIGS. 12A, 12B, 12C, 12E, 12E and 12F show illustrative use of a recording area of a ring buffer memory.

First, it is assumed that the (n−1)st GOP ($GOP_{n-1}$), nth GOP ($GOP_n$) and the (n+1)st GOP ($GOP_{n+1}$) have been recorded on the recording medium, as shown in FIG. 12A, and that reverse direction reproduction is started as from the $GOP_{n+1}$.

Figure 12B:
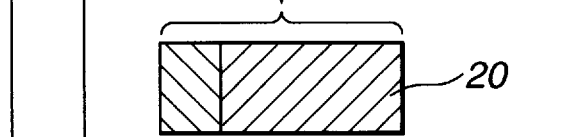
Figure 12C:
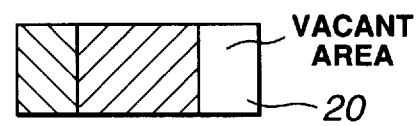

At this time, the encoded data is read, in an amount corresponding to the vacant area of the ring buffer memory 820, in a direction from the trailing end towards the leading end of the $GOP_{n+1}$, as shown in FIG. 12B. The read-out encoded data is written in the ring buffer memory 820. In the embodiment of FIG. 12B, the encoded data of the $GOP_{n+1}$ and the encoded data of the latter portion of the directly previous GOP, that is $GOP_n$, are read, and written in the ring buffer memory 820.

The encoded data is read, in an amount corresponding to the vacant area of the ring buffer memory 820, and sent to the demultiplexer 85. Thus, if there is any encoded data unneeded for the subsequent decoding, the recording region of the ring buffer memory 820 in which has been saved the encoded data is evacuated and set as a vacant area.

Figure 12D:
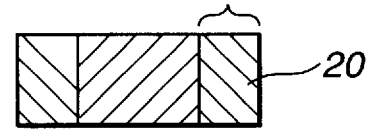
Figure 12E:
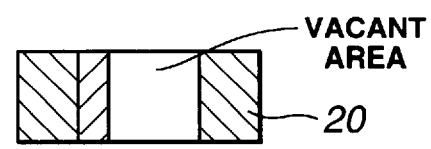

Then, the continuing portion of the encoded data is read out in an amount corresponding to the vacant area of the ring buffer memory 820 and written in the vacant area of the ring buffer memory 820. In the embodiment of FIG. 12D, part of the continuing portion of the encoded data GOPn is read and written in the ring buffer memory 820.

The encoded data required by the picture to be reproduced next is read out from the ring buffer memory 820 and sent to the demultiplexer 85. Thus, if there is any encoded data not needed for the subsequent decoding, the recording area of the ring buffer memory 820, in which has been stored the encoded data, is evacuated and set as a vacant area.

Figure 12F:
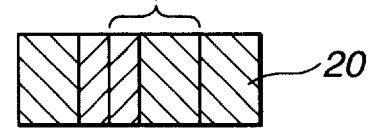

Then, the continuing portion of the encoded data is read in an amount corresponding to the vacant area of the ring buffer memory 820 and written in the vacant area of the ring buffer memory 820, as shown in FIG. 12F. In the embodiment of FIG. 12F, the remaining portion of the $GOP_n$ and a portion of the latter half of the GOP directly previous to the $GOP_n$, that is $GOP_{n-1}$ are read as the encoded data and written in the ring buffer memory 820.

In a similar manner, the operation of reading out the encoded data from the ring buffer memory 820, evacuating the recording area of the ring buffer memory 820 in which has been stored the unneeded encoded data, and writing new encoded data in the evacuated area of the ring buffer memory 820, is repeated sequentially.

The ring buffer memory 820 has a recording capacity corresponding to one GOP or more. Stated differently, the ring buffer memory 820 has a recording capacity not less than the maximum value of the data volume required for one decoding. Thus, by employing the ring buffer memory 820 as described above, the encoded data required for one decoding is present at all times on the ring buffer memory 820. Thus, by carrying out the reverse direction reproduction using the ring buffer memory 820, it becomes unnecessary to perform the processing of repeatedly reading out the same encoded data from the recording medium 8100 for decoding the respective pictures during the reverse direction reproduction.

In case of performing the reverse direction reproduction using the ring buffer memory 820, the encoded data is written in the ring buffer memory 820 so that the array of the encoded data on the recording medium 8100 will be equal to that on the ring buffer memory 820, as shown in FIG. 12.

That is, if, every time a vacant area is produced on the ring buffer memory 820, the encoded data is read from the recording medium 8100, and sequentially written in the ring buffer memory 820, the encoded data is written so as to be consecutive on the ring buffer memory 820. This enables the recording area of the ring buffer memory 820 to be utilized highly efficiently.

Stated differently, if the ring buffer memory 820 is used in this manner, the volume of the encoded data to be held on the ring buffer memory 820 can be suppressed to a minimum, that is, if the recording capacity is just large enough to accommodate the maximum value of the data volume required for one decoding, the necessary condition for application of the present invention is met.

According to the present invention, the processing of repeatedly reading out the same data from the recording medium 8100 for decoding the respective pictures during reverse direction reproduction is not needed, thus realizing high-speed reverse direction reproduction. Moreover, by using a certain contrivance in the writing sequence into the ring buffer memory 820, the recording area can be utilized efficiently to realize the concept of the present invention with a small recording capacity. In addition, since a majority of the DVD reproducing devices are inherently provided with ring buffer memories, the device is not in need of drastic changes. That is, by application of the present invention, the reverse direction reproduction can be expedited while the cost increase is suppressed to a minimum.

In the above explanation, the processing is executed in terms of the GOP as a minimum size unit containing at least one intra-frame predictive-coded picture, it is of course possible to use a unit larger than the GOP. That is, it is possible to set the recording capacity of the ring buffer memory 820 so as to be not less than one GOBU to execute the processing with the GOBU as a unit. It is also possible to set the recording capacity of the ring buffer memory 820 so as to be not less than one cell to execute the processing with the cell as a unit.

In the above explanation, the ring buffer memory 820 is used as memory means for saving the encoded data read out from the recording medium 8100. The ring buffer memory is highly convenient as memory means for holding the encoded data read out from the recording medium since the use of the ring buffer memory guarantees highly efficient use of the recording area. However, any suitable memory means other than the ring buffer memory may, of course, be used for holding the encoded data read out from the recording medium if such memory means has sufficient recording capacity.

What is claimed is:

1. A reproducing apparatus for reverse direction reproduction of picture data compressed by exploiting correlation between pictures, comprising:

reproducing means for reproducing said picture data from a recording medium;

decoding means for decoding reproduced picture data;

a single frame memory for storing picture data in an amount corresponding to a plurality of frames, said frame memory having a recording capacity of not less than four frames and less than one GOP;

writing means for writing decoded picture data in said frame memory;

control means for performing control so that, if there lacks a vacant area in said frame memory before decoding the picture data to be displayed, a storage area of said frame memory is sequentially overwritten beginning from an area of a recording area in which picture data later in the display order is recorded and so that an area of said recording area in which the picture data already displayed are recorded will be set as a vacant area; and readout means for reading out the decoded picture data stored in said frame memory in a sequence reversed from the usual sequence;

whereby said apparatus is operable in a fast reverse mode in which MPEG video is reverse reproduced and B-type MPEG frames are used in the fast reverse reproduction.

2. The reproducing apparatus according to claim 1 wherein said control means includes means for performing control so that, at the time of start of the reverse direction reproduction, said frame memory is filled with picture data that is continuously displayed before starting the display.

3. A method for reproducing compressed data by reverse direction reproduction using correlation between pictures, comprising the steps of:

reproducing said picture data from a recording medium;

decoding the reproduced picture data;

storing the decoded picture data in a single frame memory, said frame memory having a recording capacity, of not less than four frames and less than one GOP;

controlling so that, if the frame memory has no vacant area before decoding picture data to be displayed, said frame memory is sequentially overwritten beginning from the areas in which picture data later in the display order are stored, and so that the area in which the picture data already displayed will be set as vacant areas; and reading out decoded picture data stored in said frame memory in an order reversed from the usual order;

whereby said method is operable in a fast reverse mode in which MPEG video is reverse reproduced and B-type MPEG frames are used in the fast reverse reproduction.

4. The reproducing method according to claim 3 wherein said controlling step includes a step of performing control so that, at the time of start of the reverse direction reproduction, said frame memory is filled with picture data that is continuously displayed before starting the display.

5. The reproducing apparatus according to claim 1, further comprising a ring buffer memory, and wherein:

said reproducing means reads out encoded data from a recording medium, having said encoded data recorded thereon, said encoded data having been compressed by exploiting inter-frame correlation in terms of a picture group structure as a unit;

said ring buffer memory has a storage capacity not less than the volume of the encoded data of the picture group structure, said ring buffer memory holding the encoded data read out from said recording medium by said reproducing means;

said decoding means is operable to decode the encoded data read out from the ring buffer memory; and said control means is operable to hold the encoded data of the picture group structure containing a picture to be reproduced in said ring buffer memory, at the time of reproducing the encoded data recorded on the recording medium in the reverse direction, and for reading out the encoded data repeatedly from the ring buffer memory to send the read-out encoded data to said decoding means.

6. The reproducing apparatus according to claim 5 wherein if, at the time of the reverse direction reproduction, the encoded data held by said ring buffer memory becomes unnecessary due to completion of decoding, the area of said ring buffer memory which held the encoded data which has become unnecessary is sequentially evacuated and set as vacant area, and wherein, if there is any vacant area in said ring buffer memory, said readout means reads out the encoded data which are now necessary to store the necessary encoded data sequentially in the vacant area of said ring buffer memory.

7. The method for reverse direction reproduction according to claim 3, wherein:

said step of reproducing includes reproducing encoded data from a recording medium, having said encoded data recorded thereon, said encoded data having been compressed by exploiting inter-frame correlation in terms of a picture group structure as a unit;

holding, in a ring buffer memory, the encoded data of at least one picture group structure containing a picture to be reproduced, said ring buffer memory having a storage capacity not less than the volume of the encoded data of the picture group structure;

repeatedly reading out from said ring buffer memory the encoded data required for decoding a picture to be decoded; and decoding the read-out encoded data.

8. The method for reverse direction reproduction according to claim 7 wherein, if, at the time of the reverse direction reproduction, the encoded data held by said ring buffer memory becomes unnecessary due to completion of decoding, the area of said ring buffer memory which held the encoded data now unnecessary is sequentially evacuated and set as vacant area, and wherein, if there is any vacant area in said ring buffer memory, the encoded data now necessary is read out and sequentially stored in the vacant area of said ring buffer memory.

* * * * *